S. C. KENDRICK.
GATE LIFTING DEVICE.
APPLICATION FILED DEC. 2, 1916.
1,259,412.
Patented Mar. 12, 1918.
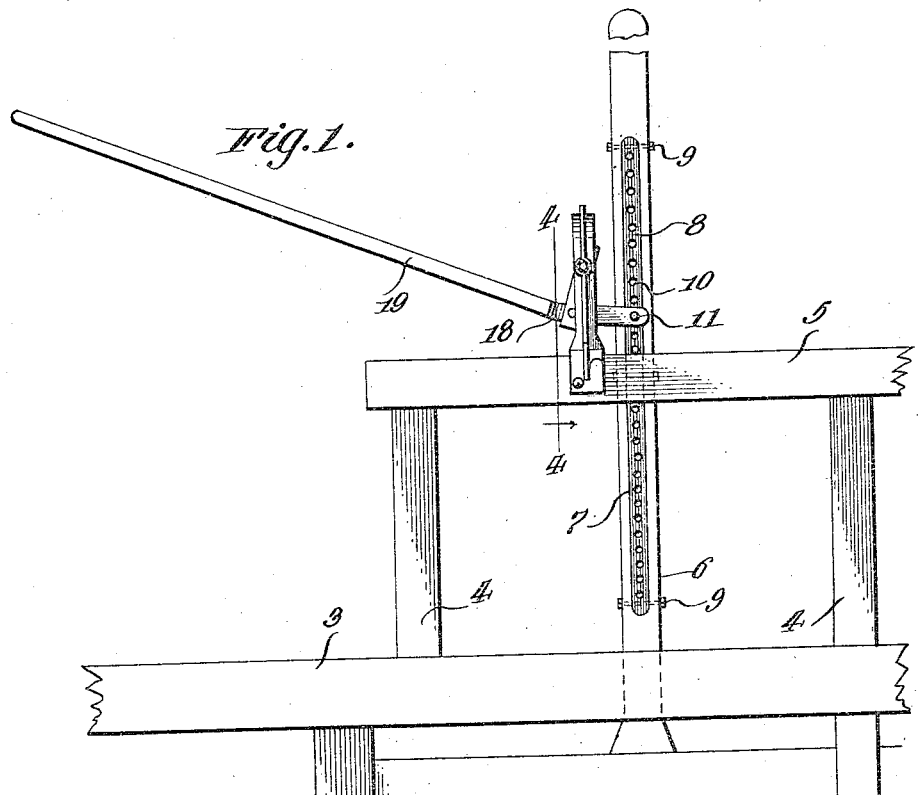
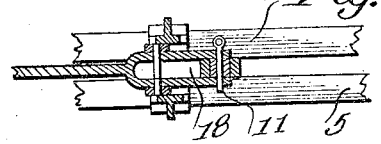
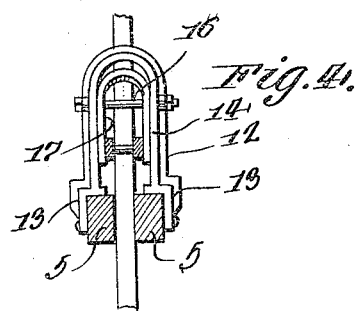
INVENTOR
Sterling C. Kendrick
WITNESSES
Guy M. Spring
Wm H. Mulligan
ATTORNEY

UNITED STATES PATENT OFFICE.

STERLING C. KENDRICK, OF HOLTVILLE, CALIFORNIA.

GATE-LIFTING DEVICE.

1,259,412.     Specification of Letters Patent.     Patented Mar. 12, 1918.

Application filed December 2, 1916. Serial No. 134,690.

*To all whom it may concern:*

Be it known that I, STERLING C. KENDRICK, a citizen of the United States, residing at Holtville, in the county of Imperial and State of California, have invented certain new and useful Improvements in Gate-Lifting Devices, of which the following is a specification.

This invention relates to a gate lifting device and more particularly to a mechanism for raising and lowering the gates usually employed for obstructing the water in irrigating ditches, the primary object being to raise and lower the gates easily and quickly so that the proper irrigation of the soil may be systematically accomplished.

One of the objects of the invention resides in the provision of a gate stem disposed in close proximity to a supporting structure having a mechanism operated by a handle mounted upon the supporting structure and adapted to coöperate with the gate stem for raising the gate in the irrigating ditch.

As a further object of the invention the device is provided with a relatively long operating lever having one end disposed in close juxtaposition to the gate stem, the gate stem and the end of the lever being provided with openings adapted to intermittently register for receiving a pin whereby the gate stem may be raised and lowered for employing the same motion to the gate.

Another object of the invention resides in the provision of a gate having a gate stem extending vertically therefrom and provided with an elongated slot for receiving a reinforcing cleat, the cleat being provided with the adjusting openings which receive the lifting pin.

A further object of this invention is the provision of a gate lifting device which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a fragmentary side elevation of an irrigating ditch gate showing my invention applied thereto.

Fig. 2 is a fragmentary side elevation of the supporting standard to which the operating mechanism is connected.

Fig. 3 is a section on the line 3—3 of Fig. 2.

Fig. 4 is a section on the line 4—4 of Fig. 1.

Referring to the drawing, wherein is illustrated the preferred form of my invention, and in which like numerals of reference indicate corresponding parts throughout the several views, the gate 1, only a portion of which is shown in the drawing, has its ends slidably mounted in retaining posts 2, only one of which is shown in the drawing.

A beam 3 extends across the irrigating ditch and is supported by the posts 2 while the lever supporting structure is mounted upon the beam 3. This structure comprises a plurality of vertical standards 4 which support the horizontal guide beams 5. The guide beams 5 are arranged in spaced relation as clearly shown by Figs. 3 and 4 of the drawing and the space between the beams 5 is sufficient to receive the gate stem 6 which has its lower end fastened to the gate 1. This gate stem receives the lifting levers necessary to raise the gate.

The stem 6 is provided with a longitudinal slot 7 extending for the greater part of the length of the stem and adapted to receive a reinforcing cleat 8. Of course, it will be understood, that the gate stem 6 may be constructed from a piece of wooden material and the reinforcing cleat 8 is provided for the purpose of reinforcing the gate stem at the point at which the greatest strain occurs when the gate 1 is being lifted. The cleat 8, therefore, is preferably constructed from cast iron and may consist of any number of pieces of sufficient length to fill the slot 7 when the pieces are in assembled position. This construction will greatly reduce the cost of construction and permit the parts to be easily assembled. Transversely extending fastening bolts 9 are extended through openings formed in the gate stem and also through openings in the reinforcing cleat. The apertures 10 of the cleat are extended for the entire length of the cleat and are equally spaced apart for receiving the lifting pin 11.

Mounted upon the guide beams 5 is a supporting yoke 12 which, as shown by Fig. 4 of the drawing, consists of an arcuate member having its terminals provided with flanges 13 each of which is bolted to one of the guide beams 5. The arcuate supporting member 12 is substantially inverted U-shape in formation, thus providing the two side supporting arms 14 which are adapted to receive the end of a retaining pin 16. Mounted upon the retaining pin and embraced by the arms 14 is a similar inverted U-shape member 17 having its terminals connected to the bifurcated portion 18 of the operating lever 19. A pivot pin 20 connects the terminals of the members 17 to the bifurcated portion 18 of the operating handle. It is to be observed that the bifurcated end 18 of the handle embraces the gate stem 6 and the terminals of the handle are provided with apertures for receiving the ends of the lifting pin 11 as clearly shown by Fig. 3 of the drawing. The cleat is also provided with a stop pin 22 which is adapted to be thrust through one of the openings 10 in the cleat for preventing the gate from dropping when the operating lever is being raised to begin another lifting operation.

In operation, the operator will grasp the free end of the lever 19 and exert a downward pull thereon. This will cause the lever to swing on the pivot 21 and the gate stem will thus be lifted through the medium of the lifting pin 11 which co-acts with the ends of the bifurcated portion of the lever. The smaller U-shape member 17 swings in a short arc while the lifting operation is proceeding thereby compensating the tendency of the lifting pin to swing in an arc when the lever is being operated. A true vertical lift is thus exerted upon the lifting pin for lifting the gate. When the lever has reached its limit of movement, the operator will insert the stop pin 22 in one of the apertures 10 immediately above the upper edge of the guide beams 5 and the ends of the stop pin 22 will be permitted to rest upon the edges of the guide beams. This will hold the gate stem in raised position until the pin 11 can be removed and the lever 19 raised for alining the apertures in the bifurcated portion of the lever with one of the apertures directly above the pin 22. The pin 11 will then be again placed in position and another lifting operation will proceed. Thus, the gate may be raised to any desired position for permitting any amount of water to pass through the irrigating ditch.

From the foregoing it will be observed that a very simple and durable gate lifting device has been provided, the details of which embody the preferred form. I desire it to be understood however, that slight changes in the minor details of construction may be made without departing from the spirit of the invention or the scope of the claims hereunto appended.

I claim:

1. A gate lifting device, comprising in combination with a gate and a gate stem, the latter having an elongated slot therein, a reinforcing cleat mounted in the said slot and having its sides flush with the sides of the gate stem provided with a plurality of equally spaced openings, a supporting structure, a lifting lever pivotally mounted on the said supporting structure and including a bifurcated end embracing the said stem and engageable with the said flush sides of the cleat and a pin extending through the bifurcated end of the lever and removably engageable with any one of the openings in the said cleat.

2. A gate lifting device comprising, in combination with a gate and a gate stem, the latter having a longitudinal slot therein, a reinforcing cleat mounted in the said slot and having its sides flush with the sides of the said stem and provided with a plurality of equally spaced openings, a supporting yoke, a lever having a bifurcated end embracing the said stem and engageable with the sides of the said cleat, a removable pin carried by the bifurcated end of the lever and detachably engageable with the said cleat through any one of the said openings, an inverted U shaped member pivotally carried by the said supporting yoke and connected to the said bifurcated end of the lever and a removable stop pin carried by the said cleat.

3. A gate lifting device comprising, in combination with a gate and a gate stem, the said gate being provided with a longitudinal slot, reinforcing means disposed within the slot, a supporting structure, and lifting means adapted to coöperate with the said reinforcing means including a pair of pins adapted to be intermittently connected and disconnected from the said reinforcing means.

4. A gate lifting device comprising, in combination with a gate and a gate stem, a reinforcing cleat carried by the gate stem and provided with a plurality of longitudinally spaced openings, a supporting structure, and lifting means pivotally carried by the supporting structure, and means coöperating with the said lifting means and the said reinforcing cleat for exerting a lifting motion upon the cleat when the said lifting means is operated and for retaining the said cleat in raised position while the said lifting means is being returned to initial operative position.

In testimony whereof I affix my signature in presence of two witnesses.

STERLING C. KENDRICK.

Witnesses:
JASPER V. YEARGIN,
SAMUEL F. WEBB, Jr.